United States Patent [19]

Pesante

[11] 4,057,259
[45] Nov. 8, 1977

[54] COLLET STOP AND CHUCK ASSEMBLY

[76] Inventor: Domingo F. Pesante, 222 S. Princeton Ave., Arlington Heights, Ill. 60005

[21] Appl. No.: 701,296

[22] Filed: June 30, 1976

[51] Int. Cl.$^2$ .............................. B23B 31/20
[52] U.S. Cl. .............................. 279/1 S; 82/34 C
[58] Field of Search ............... 279/1 S, 46, 47, 48, 279/50, 51, 52, 53, 1 A; 82/34 C

[56] References Cited

U.S. PATENT DOCUMENTS

| 807,487 | 12/1905 | McClellan | 279/1 S |
|---|---|---|---|
| 1,455,554 | 5/1923 | Stercklen | 279/1 S |
| 2,386,960 | 10/1945 | Jellinek | 279/1 S |
| 2,469,160 | 5/1949 | Evans | 279/1 S |
| 2,668,719 | 2/1954 | Harmon | 279/1 S |
| 2,698,754 | 1/1955 | Bernstein | 279/1 S |
| 2,756,059 | 7/1956 | Knapp | 279/1 S |
| 3,385,607 | 5/1968 | Hughes | 279/1 S |

Primary Examiner—Harrison L. Hinson
Assistant Examiner—Horace M. Culver
Attorney, Agent, or Firm—Rummler & Snow

[57] ABSTRACT

A simple inexpensive adapter and drill chuck to support a stop pin axially aligned in a collet chuck.

2 Claims, 5 Drawing Figures

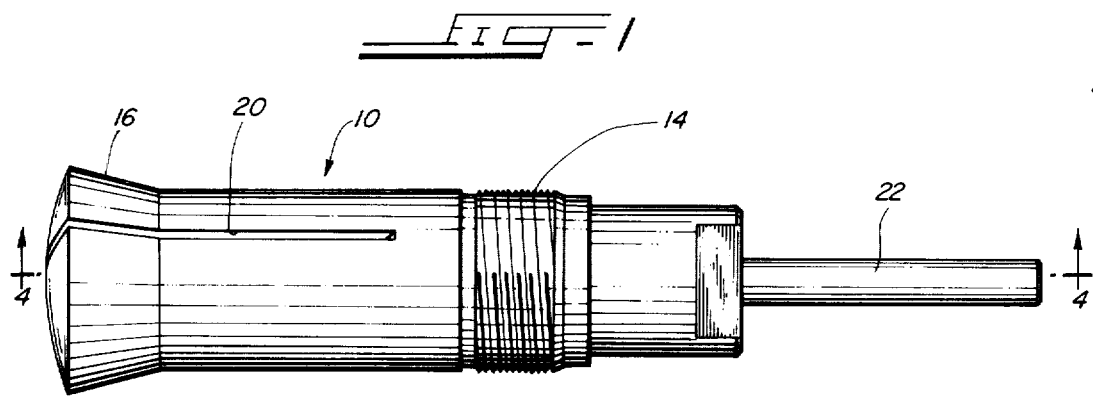
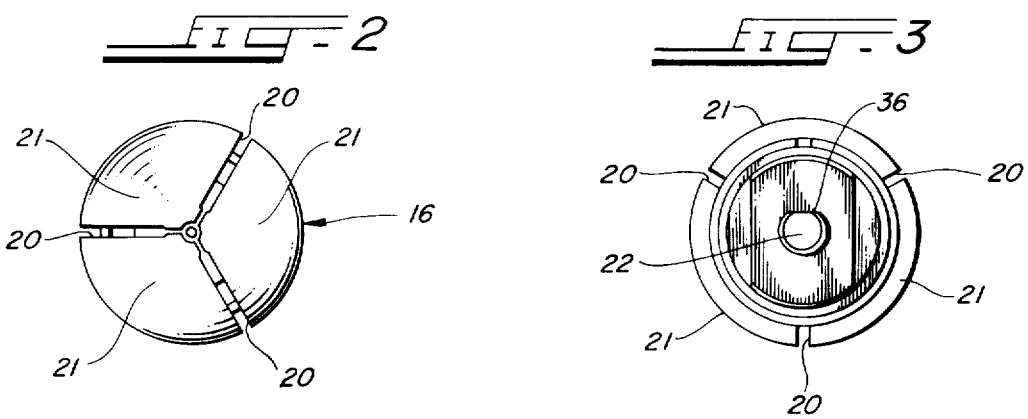
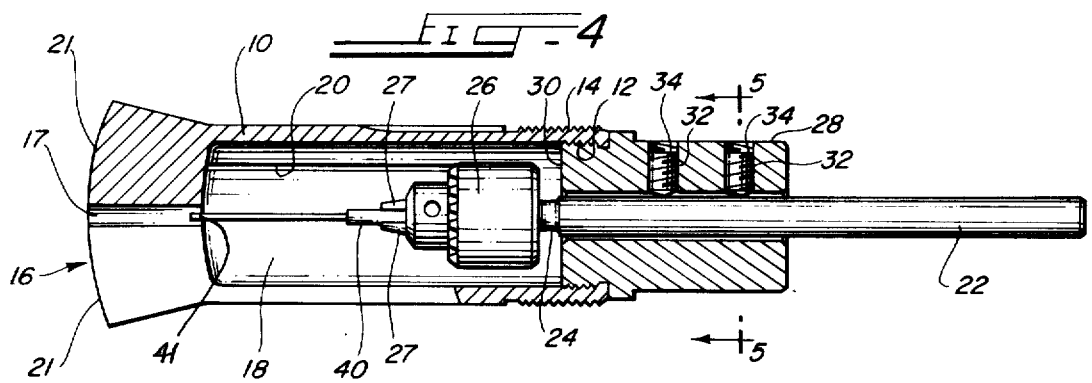
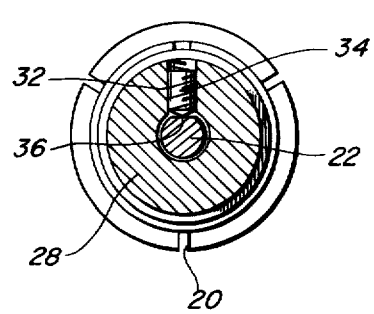

COLLET STOP AND CHUCK ASSEMBLY

BACKGROUND OF THE INVENTION

Stop insert pins associated with collet chucks are old in the art but normally are used as a lathe stop (see U.S. Pat. No. 2,830,821) for longitudinal adjustment of the stop head. Other stop pins are known in the art but not used in the manner employed in the instant invention unless by use of complicated mechanisms such as shown in U.S. Pat. No. 2,830,821 employing heavy threaded collars.

SUMMARY OF THE INVENTION

A chuck positioned on the end of an elongated rod for supporting a stop pin axially interior of a collet chuck, and an adapter removably secured to one end of said collet having an axial bore to support said rod, whereby said pin is readily adjustable longitudinally in said collet and secured in any desired position.

BRIEF DESCRIPTION OF THE DRAWINGS

FIG. 1 is a side elevational view of a collet with the device of the present invention in position;

FIG. 2 is an end elevational view taken from the left of FIG. 1;

FIG. 3 is an end elevational view taken from the right end of FIG. 1;

FIG. 4 is a vertical cross-sectional view taken on the line 4—4 of FIG. 1; and

FIG. 5 is a cross-sectional view taken on the line 5—5 of FIG. 4.

DETAILED DESCRIPTION OF THE DRAWINGS

The usual hollow collet 10 is provided with interior and exterior threads 12, 14, respectively, at one end, and the usual head 16 at the other end having an axial bore 17. The interior 18 of the collet is hollow over a major portion thereof and the head 16 and body are provided with the usual clefts 20 to form jaws 21 therebetween.

An elongated rod 22 has an offset end 24 which is tapered downwardly and forwardly to frictionally support a drill chuck 26 having the usual expandible jaws 27 and operable with the usual chuck key. An adapter or housing 28 is drilled axially to slidingly receive the rod 22. The adapter or housing 28 is provided with an offset portion 30 and provided with threads for cooperative attachment to the threads 12 of the collet. The adapter 28 is also provided with a collar 32 against which the end 34 of the collet abuts in operative position.

The adapter or housing 28 is also provided with a pair of threaded perforations 32 to receive setscrews 34 which are arranged to have their respective lower ends abut against the flat surface 36 on rod 22 to adjustably position the rod longitudinally.

A stop pin 40 of appropriate length is positioned at one end in the jaws 27 of the drill chuck 26 and extends axially in the collet.

The collet is placed in the spindle of a machine (not shown) and positioned on the threads 14 to close the head 16 of the collet to support the material to be worked upon in a lathe or other machine.

It is important that the material to be worked upon be properly positioned in the collet and hence the stop pin is provided to limit insertion of the said material in the collet. Stop pins come in many diameters, usually from 1/64 to 3/16 inches, and inbetween, and the length of the pin is about 1½ inches. The diameter of the pin depends upon the bore 17 in the collet, which varies with various size collets. Of course, the bore 17 is of larger diameter than the diameter of the pin 40 so as not to interfere with the closing of the jaws 21 to hold the material to be worked upon.

To vary the length of the stop 40, the setscrews are partially turned upwardly and the rod 22 shifted longitudinally to the correct position desired and the setscrews set up again to prevent axial movement of the rod 22 and thus the stop pin 40. Also, different diameter pins are readily interchangeable by removing the collet 10, opening the drill chuck 26, removing the current pin 40 and replacing with a new one. The chuck will hold all sizes of pins 40 from 0.001 to 1.125 inches in diameter. The work abutting end 41 of the pin may also be of greater diameter than the shank end and may take on any configuration just so long as it will seat in the hollow portion 20. Also, the work abutting end of the pin 40 may be hollowed out for holding special parts.

In known stop pins on the market, they are usually provided with an enlarged threaded end which is normally difficult and time consuming to remove and replace.

Although but one specific embodiment of this invention is herein shown and described, it will be understood that details of the construction shown may be altered or omitted without departing from the spirit of the invention as defined by the following claims.

I claim:

1. A stop pin assembly for collets including a hollow collet having a gripping head at one end and an axial bore, and having interior and exterior threads on the opposite end, in combination with:
    a. an adapter axially bored and adapted to be removably secured to said interior threads of said collet;
    b. an elongated rod having a flat surface thereon, said rod positioned in said bore of said adapter and extending therefrom;
    c. a drill chuck having expandible jaws, said chuck positioned in the interior of said collet and removably secured to one end of said rod by friction;
    d. a stop pin removably secured at one end in said chuck jaws and axially aligned in said collet; and
    e. means in said adapter cooperating with the flat surface of said rod to adjustably position said rod longitudinally in said adapter.

2. The device according to claim 1 wherein the adapter is provided with a collar against which the threaded end of the collet abuts, said rod having an offset end to receive the drill chuck and said offset end being tapered downwardly and forwardly providing a friction fit.

* * * * *